United States Patent

Sammells et al.

[11] 4,328,287
[45] May 4, 1982

[54] GAS FLOW THROUGH ELECTRODES

[75] Inventors: Anthony F. Sammells, Naperville, Ill.; Michael J. Powers, LaGrangeville, N.Y.

[73] Assignee: Institute of Gas Technology, Chicago, Ill.

[21] Appl. No.: 227,704

[22] Filed: Jan. 23, 1981

[51] Int. Cl.³ ............................................. H01M 8/08
[52] U.S. Cl. ........................................ 429/15; 429/17; 429/19; 429/27; 429/34; 429/44
[58] Field of Search ..................... 429/14, 15, 17, 19, 429/27, 34, 40, 41, 44, 13, 51, 72

[56] References Cited

U.S. PATENT DOCUMENTS

| | | | |
|---|---|---|---|
| 2,275,281 | 3/1942 | Berl | 429/34 |
| 3,043,898 | 7/1962 | Miller et al. | 429/27 |
| 3,177,097 | 4/1965 | Beals | 429/34 |
| 3,201,282 | 8/1965 | Justi et al. | 429/13 |
| 3,462,308 | 8/1969 | Winters | 429/17 |
| 3,525,643 | 8/1970 | Spahrbier et al. | 429/15 |

*Primary Examiner*—Anthony Skapars
*Attorney, Agent, or Firm*—Thomas W. Speckman

[57] ABSTRACT

Gas flow through electrodes for electrochemical cells having a porous flow through matrix with electrocatalysts supported on the surfaces of the matrix within the pores, the pores providing a through route for a metastable colloid of electrochemically reducible or oxidizable gas bubbles in liquid electrolyte, with absorption of some of the gaseous component on the walls of the pores. Improved depolarization of the electrode provides long life and stable gas flow through electrodes for electrochemical cells.

24 Claims, 3 Drawing Figures

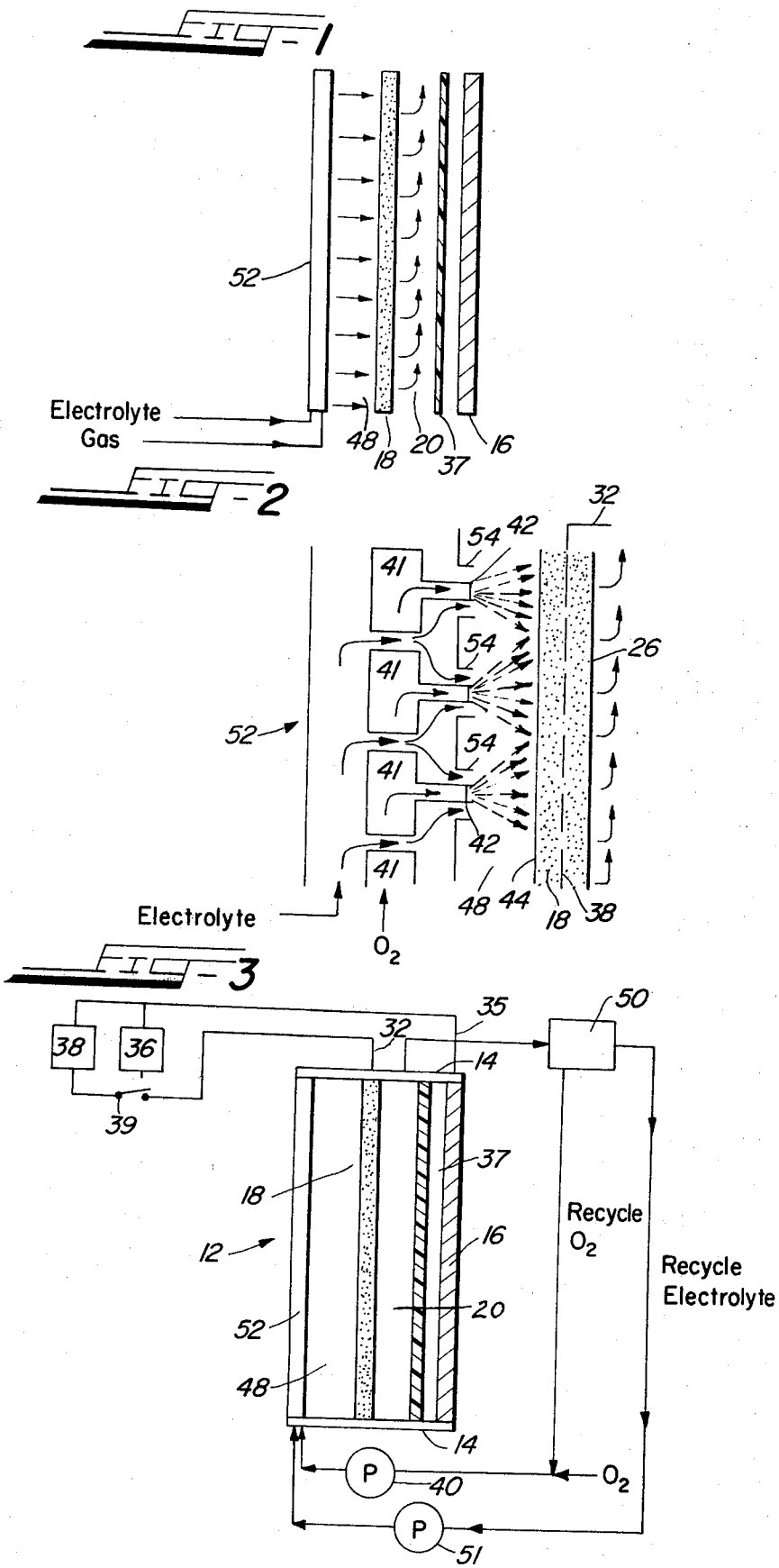

GAS FLOW THROUGH ELECTRODES

BACKGROUND OF THE INVENTION

This invention relates to gas flow through electrodes for electrochemical and fuel cells, and more particularly to porous catalyst electrodes for electrochemical cells wherein a metastable colloid of electrochemically reducible or oxidizable gas bubbles in liquid electrolyte flow through the pores of the electrode, with absorption of the gaseous component on to the walls of the pores.

Electrochemical cells of the type having a porous flow through electrode produce electricity by inducing electrochemical reactions at gas-liquid-solid interface sites on at least one of the electrodes. In electrochemical cells having at least one electrochemically reducible or oxidizable gas flow through electrode, the current-producing capability of the cells is limited by the total number of electrode reaction sites, which are those sites providing intimate contact between electrochemically reactive gas, liquid electrolyte and solid catalyst. After the desired reaction takes place at such an interface site, the reaction products must be removed from the site and electrochemically reducible or oxidizable gas and liquid electrolyte reactant must be replenished at the site before another reaction may occur.

Most currently used gas diffusion electrodes have a hydrophobic region, such as Teflon, bonded on the outer side permitting through gas flow while preventing electrolyte passage. This type of diffusion electrode frequently becomes flooded with electrolyte due to decrease in hydrophobicity within the diffusion region of the electrode. The diffusion region consists of a mixture of the electrocatalyst and hydrophobic material (such as Teflon) and is the region where the electrochemical reaction takes place.

Improved electrodes for oxygen reduction have been suggested by introducing oxygen under pressure to the central portion of a porous graphite cathode carrier, as described in U.S. Pat. No. 2,275,281. However, forcing oxygen out from the center of the electrode to the electrolyte may prevent electrolyte from entering inner pores in the carrier, which are potential reaction sites. A gas depolarized battery is taught by U.S. Pat. No. 3,043,898 wherein a series of primary cells having metallic anodes, porous cathodes, a carrier material between the electrodes and means for dripping electrolytic solution onto the carrier material to aid in removal of reaction products from the cell. The cathode is backed by a porous diffuser through which a gaseous depolarizer is passed.

It has been suggested by U.S. Pat. No. 3,201,282 that a porous catalyst electrode for a fuel cell be provided with a catalytically less active surface layer of smaller pore radii than the catalytically active layer to make the catalytically active layer less accessible to the ions emitted from the counter electrode.

It is an object of this invention to provide long-life and stable gas flow through electrodes for electrochemical cells.

Another object of this invention is to provide an electrode for electrochemical cells which provides increased electrochemical reaction rates due to improved depolarization of the electrode providing the potential for long life as compared to Teflon bonded diffusion electrodes.

It is another object of this invention to provide a gas flow through electrode which is not susceptible to flooding as in Teflon bonded diffusion type electrodes.

It is yet another object of this invention to provide an oxygen flow through electrode providing improved depolarization.

Another object of this invention is to provide an electrode for oxygen reduction which is depolarized by passing a colloid of suspended oxygen bubbles in liquid electrolyte through a porous flow through electrode.

SUMMARY OF THE INVENTION

A flow through electrode is provided with a porous flow through matrix with electrocatalysts supported on the surfaces of the pores in the matrix. A plurality of electrochemically reducible or oxidizable gas bubbles, having a smaller average diameter than the average diameter of the pores in the matrix, and liquid electrolyte is supplied to a colloid-forming zone on the side of the flow through electrode matrix away from the counterelectrode to form a colloid of electrochemically reactive gas in the liquid electrolyte. The electrochemically reducible or oxidizable gas-liquid colloid passes through the flow-through electrode porous matrix to a liquid electrolyte zone on the other side of the electrode separating the electrode and counterelectrode. Electrochemical reactions take place at the three phase interface of gas-liquid electrolyte-solid catalyst and the reaction products are constantly removed from the reaction zone by the flowing electrolyte which passes through the flow through electrode porous matrix. The process for electrode depolarization by passage of a colloid of electrochemically reactive gas bubbles in electrolyte through a porous flow through electrode matrix supporting a solid catalyst according to this invention provides stable electrodes with improved depolarization and which are not susceptible to flooding as in conventional Teflon bonded diffusion type electrodes.

BRIEF DESCRIPTION OF THE DRAWINGS

The above objects and other features of this invention and the manner of obtaining them will become more apparent, and the invention will be best understood by reference to the following description of the invention taken in conjunction with the accompanying drawings in which:

FIG. 1 is a diagrammatic side view of an electrochemical cell according to one embodiment of this invention;

FIG. 2 is an enlarged diagrammatic view of the electrolyte-gas distributor used in conjunction with the flow-through electrode shown in FIG. 1; and FIG. 3 is a diagrammatic view of the electrochemical cell of FIG. 1 together with electrolyte treatment and recycle components.

DESCRIPTION OF PREFERRED EMBODIMENTS

Referring to the figures, an electrochemical cell, such as a metal-air electrochemical cell, is shown embodying the principles of the flow through electrode and process of this invention. While the metal-air electrochemical cell is used in an illustrative manner, it is clear to one skilled in the art that the same flow through electrode and process of this invention can be applied to any cell or electrode, cathode or anode, of the type embodying a gas-liquid reaction taking place at the interface of a solid, such as supported catalysts, and the term electrochemical includes fuel cells of this type as well.

Electrochemical cell 12 is shown comprising retainer 14, counterelectrode 16 and flow through electrode 18 which is separated from counterelectrode 16 by liquid electrolyte volume 20 and separator 37.

Counterelectrode 16 may be fashioned of any suitable materials known to the art, such as a consumable metal in metal-air electrochemical cells, non-consumable metal such as platinum in electrochemical cells, or the counterelectrode may have the same constructtion as the flow through electrode of this invention, as for example in hydrogen-oxygen fuel cells.

The liquid electrolyte may be any suitable electrolyte as known in the art for electrochemical cells, such as aqueous acidic electrolytes, such as hydrochloric acid, sulfuric acid, phosphoric acid; and aqueous alkaline electrolytes, such as potassium hydroxide or sodium hydroxide. Non-aqueous liquid electrolytes such as glyme, acetonitrile and propylene carbonate may be used.

An important feature of this invention is an electrode assembly comprising a porous flow through matrix having a plurality of pores, electrocatalysts supported on the surfaces of the matrix within said pores, means for supplying a plurality of electrochemically reducible or oxidizable gas bubbles having a smaller average diameter than the average diameter of the pores to a colloid forming zone in communication with one side of the flow through matrix, means for supplying liquid electrolyte to the colloid forming zone, and means for passing a colloid of the electrochemically reducible or oxidizable gas bubbles and liquid electrolyte through the pores in the electrode matrix to the opposite side of the porous flow through matrix.

Flow through electrode 18 has a stable, porous, flow through matrix with suitable electrocatalysts supported on the surfaces of the matrix within pores throughout the matrix. Colloid forming zone 48 is on side 44 of flow through electrode 18 away from counterelectrode 16. Electrolyte is supplied to colloid forming zone 48 by electrolyte supply means which, as shown in the figures, includes electrolyte recycle pumping means 51 and electrolyte treating means 50 for removing reaction products from the electrolyte and suitably treating the electrolyte for recycle through distributor 52 to colloid forming zone 48. A reactant gaseous bubble forming means supplies to the colloid forming zone a plurality of reactant gas bubbles having a smaller average diameter than the average diameter of the pores in the porous matrix. As shown in the figures, the bubble forming means may comprise pumping means 40 and distribution-bubble forming means 42. A reactant gas in electrolyte colloid is formed in colloid forming zone 48 and, due to pressure differential, flows through the pores of electrode matrix 26 to electrolyte volume 20. Due to the size relationship of the reactant gas bubbles in the colloid, the reactant gas bubbles with their associated liquid encapsulating them, pass through the pores of electrode matrix 26, some of the reactant gas absorbing on the pore surfaces forming intimate gas-liquid-solid interfaces. These interfaces provide active reaction sites for desired reaction between reactant gas and reactants in the electrolyte in the presence of solid catalyst on the surface of the porous matrix. Following electrochemical reactions at these interfaces, the reaction products are effectively transported away from the reaction site by flowing electrolyte. The gas in liquid colloid is more effective in such removal of reaction products than either phase alone, thereby making the reaction site promptly available for further reactions.

Any solid material may be used as the porous matrix in the electrode of this invention as long as it provides high surface area, tortuous, through paths from one side of the electrode to the other. The porous matrix material should be inert to the electrolyte and reactant gas system and provide a substrate for maintaining active catalysts on the surfaces of the tortuous through paths. Examples of suitable materials include porous carbon or graphite materials known to the art and porous nickel. Suitable porous matrix materials have porosity of about 55 to about 70 percent, about 63 to 67 percent being preferred. Suitable pore sizes are pores having average pore diameters of about 20 to about 60 microns, about 25 to about 30 microns being preferred. Solid electrocatalyst may be supported on the surface of the matrix within the pores by methods known to the art, such as 0.005 mg/cm$^2$ platinum catalyst deposited from chloroplatinic acid supported on the porous matrix, such as reticulated vitreous carbon or porous nickel. Separate current collector 38 may be provided to effectively transport current from electrochemical reaction sites to external electrical connection 32 when the porous matrix itself is not sufficiently electrically conductive.

Electrolyte is withdrawn from electrolyte volume 20 and passed through treating means 50, if desired, and electrolyte recycle pumping means 51, which may be any suitable pump for providing the electrolyte to colloid forming zone 48. Electrolyte treating means 50 is any suitable chemical or physical treatment apparatus for restoring the electrolyte to desired state for recycle, such as removal of reaction products in any physical state. A distributor, such as shown generally by numeral 52, may be desired to enhance colloid formation with electrolyte, to provide efficient flow patterns throughout the colloid forming zone and assure even flow distribution through the porous electrode. It is desired that the flow rate of the colloid through the porous electrode be in the order of about 5 to about 100 cm/sec, about 10 to about 20 cm/sec being preferred. It is also desired that the gas bubbles in the colloid be in excess of the requirement for reaction, in the order of about 100 to about 500 percent excess gas being provided in the colloid, on the basis of the amount of gas reacting. About 5 to about 25 cc/sec/cm$^2$ colloid flow through the porous electrode is suitable, about 10 to about 20 cc/sec/cm$^2$ being preferred.

Supply of desired gas bubbles to the colloid forming zone may be achieved by several methods. Gas may be supplied by gas pump 40 to distribution manifold 41 and nozzle means 42. Nozzle means 42 may include any nozzle confining the gas stream to the desired size or larger apertures with glass frits or metallic sponge structures suitable for forming gas bubbles of suitable average diameters as are known to the art may be used. We have found it suitable to form the gas bubbles by aspiration with the flowing electrolyte withdrawing the gas from nozzle means 42 into a suitable colloid. Suitable sized gas bubbles may be also formed by ultrasonic methods as known to the art. Electrolyte manifold 53 is provided with nozzle means 54 to cooperate with gas nozzle means 42 to form the desired colloid. To increase utilization of active areas of matrix 26, it is desired that colloid formation be relatively evenly spaced across the area of colloid forming zone 48 corresponding to side 44 of matrix 26.

Colloid passage through matrix 26 is induced by maintaining a higher pressure in colloid forming zone 48 than in electrolyte volume 20. This may be achieved by either providing the pressure to the supply of electrolyte or gas. It is usually preferred to provide the electrolyte under pressure to enhance aspiration of the gas into the colloid. When the aspiration method of colloid formation is used, pump 40 may not be necessary due to the velocity of the electrolyte through nozzles 54 drawing gas from nozzles 42 thereby providing gas movement through the recycle conduits. The amount of pressure differential desired depends upon the pore size and path length through the porous matrix and may be controlled by monitoring the electrode overpotential and utilization of an electronic control circuit readily apparent in view of this disclosure.

It is thus seen that a gas flow through electrode or electrode assembly according to this invention comprises a porous flow through matrix having a plurality of pores, electrocatalysts supported on the surfaces of the matrix within the pores, means for supplying a plurality of electrochemically reducible or oxidizable gas bubbles having a smaller average diameter than the average diameter of the pores to a colloid forming zone on the side of said flow through matrix away from a counterelectrode, means for supplying liquid electrolyte to the colloid forming zone, and means for passing the colloid of electrochemically reducible or oxidizable gas bubbles and electrolyte through the pores in the electrode matrix to an electrolyte zone separating the electrode and a counterelectrode.

In accordance with the above description, this invention provides a process for electrode depolarization thereby providing improved and stable cell performance by forming an electrochemically reducible or oxidizable gas in electrolyte colloid in a colloid forming zone on one side of a flow through electrode porous matrix, the electrochemically reducible or oxidizable gas bubbles in the colloid having smaller average diameter than the average diameter of pores in the porous matrix; and flowing the colloid of reactant gas bubbles in electrolyte through the pores to the other side of the flow through electrode porous matrix, the matrix having solid electrocatalysts supported on the surfaces of the matrix within the pores, thereby providing reactant gas, electrolyte and solid catalyst to gas-liquid-solid interface active reaction sites, the flowing colloid removing reaction products from the reaction sites and providing reactivated reaction sites for subsequent reactions.

When used in an electrochemical cell, such as a zinc-oxygen cell, as shown in FIG. 3, separator 37 may be provided as known to the art to provide a suitable ion exchange membrane for passage of ions between the anolyte and catholyte, such as Nafion (a sulfonated fluoropolyethylene sold by DuPont), polyvinylchloride, and nylon. Oxygen containing gas, air, may be supplied by gas supply means 40. Counterelectrode 16 may be zinc provided with external electrical connection 35. The flow through electrode may be provided with current collector 38 and external electrical connection 32. The electrical circuit is completed by a load across external connections 32 and 34. For charging, power supply 36 may be connected across external connections 32 and 34 with selection between load 38 and power supply 36 provided by switch 39.

Materials and methods of construction will be apparent to one skilled in the art upon reading the above disclosure. Retainer 14 must insulate the electrode from the counter electrode. Any suitable containment vessel as known to the art may be used. Individual cells may be connected in a wide variety of ways known to the art.

The following examples are set forth solely as exemplary of this invention and should not limit the invention in any way.

EXAMPLE I

An oxygen/zinc electrochemical cell was fabricated with a positive porous flow through electrode as shown in FIGS. 1–3. The oxygen electrode was 65 percent porous nickel having an average pore diameter of 25 microns with platinum deposited on the pore surfaces providing surface loadings of 0.005 mg/cm$^2$ and coating the entire real area of the porous matrix. An oxygen in electrolyte colloid was formed by aspiration forming oxygen bubbles having a diameter range of 10 to 50 microns, average 20 microns, in 6 molar aqueous potassium hydroxide electrolyte. The colloid was flowed through the porous electrode at the rate of 10 cc/sec/cm$^2$ due to the pressure of the electrolyte. A Nafion separator divided the catholyte and anolyte portions of the electrolyte. The anode was consumable zinc. A current density of 20 to 50 mA/cm$^2$ was drawn at cathodic overpotentials of 400 mV from the oxygen electrode rest potential.

EXAMPLE II

Another oxygen/zinc electrochemical cell was fabricated with a 65 percent porous reticulated vitreous carbon positive porous electrode having an average pore diameter of 50 microns with platinum deposited on the pore surfaces providing surface loadings of 0.005 mg/cm$^2$ and coating the entire real area of the porous matrix. An oxygen in electrolyte colloid was formed by aspiration forming oxygen bubbles having a diameter range of 10 to 70 microns, average 40 microns, in 6 molar aqueous potassium hydroxide electrolyte. The colloid was flowed through the porous electrode at the rate of 15 cc/sec/cm$^2$. The separator and anode were the same as described in Example I. A current density of 25 to 40 mA/cm$^2$ was drawn at cathodic overpotentials of 375 mV from the oxygen electrode rest potential.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an electrochemical cell of the type having liquid electrolyte, a counterelectrode, and a gas flow through electrode in communication with and separated from said counterelectrode by electrolyte in an electrolyte zone; the improvement in said electrode comprising:
    a porous flow through matrix having a plurality of pores, electrocatalysts supported on the surfaces of said matrix within said pores, means for supplying a plurality of electrochemically reducible or oxidizable gas bubbles having a smaller average diameter than the average diameter of said pores to a colloid forming zone on the side of said flow through matrix away from said counterelectrode, means for supplying electrolyte to said colloid forming zone, and means for passing a colloid of said electrochemically reducible or oxidizable gas bubbles and said electrolyte through said pores in said electrode matrix to said electrolyte zone separating said electrode and counterelectrode.

2. The electrochemical cell of claim 1 wherein said means for supplying electrochemically reducible or oxidizable gas bubbles comprises at least one aspiration means in said colloid forming zone and pump means for pumping electrolyte to aspirate said electrochemically reducible or oxidizable gas.

3. The electrochemical cell of claim 1 wherein said means for supplying a plurality of electrochemically reducible or oxidizable gas bubbles comprises means capable of supplying gas bubbles having average diameters about 3 to about 50 microns.

4. The electrochemical cell of claim 1 wherein said pores have average diameters of about 20 to about 60 microns.

5. The electrochemical cell of claim 4 wherein said porous matrix has a porosity of about 55 to about 70 percent.

6. The electrochemical cell of claim 1 wherein said means for supplying electrochemically reducible or oxidizable gas bubbles comprises pumping means capable of pressurizing said colloid forming zone to provide flow of formed gas-electrolyte colloid through said electrode matrix.

7. The electrochemical cell of claim 1 wherein said means for supplying electrolyte to said colloid forming zone comprises recycle pumping means and electrolyte treating means for removing reaction products from the electrolyte.

8. The electrochemical cell of claim 1 wherein said electrode is an electrochemical cell positive electrode and said porous matrix comprises reticulated vitreous carbon with platinum catalyst thereon.

9. An electrode assembly comprising: a porous flow through matrix having a plurality of pores, electrocatalysts supported on the surfaces of said matrix within said pores, means for supplying a plurality of electrochemically reducible or oxidizable gas bubbles having a smaller average diameter than the average diameter of said pores to a colloid forming zone in communication with one side of said flow through matrix, means for supplying liquid electrolyte to said colloid forming zone, and means for passing a colloid of said electrochemically reducible or oxidizable gas bubbles and said electrolyte through said pores in said electrode matrix to the opposite side of said porous flow through matrix.

10. The electrode assembly of claim 9 wherein said means for supplying electrochemically reducible or oxidizable gas bubbles comprises at least one aspiration means in said colloid forming zone and pump means for pumping electrolyte to aspirate said electrochemically reducible or oxidizable gas.

11. The electrode assembly of claim 9 wherein said means for supplying a plurality of electrochemically reducible or oxidizable gas bubbles comprises means capable of supplying gas bubbles having average diameters about 3 to about 50 microns.

12. The electrode assembly of claim 9 wherein said pores have average diameters of about 20 to about 60 microns.

13. The electrode assembly of claim 12 wherein said porous matrix has a porosity of about 55 to about 70 percent.

14. The electrode assembly of claim 9 wherein said means for supplying electrochemically reducible or oxidizable gas bubbles comprises pumping means capable of pressurizing said colloid forming zone to provide flow of formed gas-electrolyte colloid through said electrode matrix.

15. The electrode assembly of claim 9 wherein said means for supplying electolyte to said colloid forming zone comprises recycle pumping means and electrolyte treating means for removing reaction products from the electrolyte.

16. The electrode assembly of claim 9 wherein said electrode is an electrochemical cell positive electrode and said porous matrix comprises reticulated vitreous carbon with platinum catalyst thereon.

17. An electrochemical cell comprising: a retainer housing a liquid electrolyte, a counterelectrode, and a gas flow through electrode separated from said counterelectrode by said electrolyte in an electrolyte zone, said gas flow through electrode comprising a porous flow through matrix having a plurality of pores, electrocatalysts supported on the surfaces of said matrix within said pores, means for supplying a plurality of electrochemically reducible or oxidizable gas bubbles having a smaller average diameter than the average diameter of said pores to a colloid forming zone on the side of said flow through matrix away from said counterelectrode, means for supplying electrolyte to said colloid forming zone, and means for passing a colloid of said electrochemically reducible or oxidizable gas bubbles and said electrolyte through said pores in said electrode matrix to said electrolyte zone separating said electrode and counterelectrode.

18. The electrochemical cell of claim 17 wherein said means for supplying electrochemically reducible or oxidizable gas bubbles comprises at least one aspiration means in said colloid forming zone and pump means for pumping electrolyte to aspirate said electrochemically reducible or oxidizable gas.

19. The electrochemical cell of claim 17 wherein said means for supplying a plurality of electrochemically reducible or oxidizable gas bubbles comprises means capable of supplying gas bubbles having average diameters about 3 to about 50 microns.

20. The electrochemical cell of claim 17 wherein said pores have average diameters of about 20 to about 60 microns.

21. The electrochemical cell of claim 20 wherein said porous matrix has a porosity of about 55 to about 70 percent.

22. The electrochemical cell of claim 17 wherein said means for supplying electrochemically reducible or oxidizable gas bubbles comprises pumping means capable of pressurizing said colloid forming zone to provide flow of formed gas-electrolyte colloid through said electrode matrix.

23. The electrochemical cell of claim 17 wherein said means for supplying electrolyte to said colloid forming zone comprises recycle pumping means and electrolyte treating means for removing reaction products from the electrolyte.

24. The electrochemical cell of claim 17 wherein said electrode is a positive electrode and said porous matrix comprises reticulated vitreous carbon with platinum catalyst thereon.

* * * * *